US011709602B2

(12) United States Patent
Chen et al.

(10) Patent No.: US 11,709,602 B2
(45) Date of Patent: Jul. 25, 2023

(54) ADAPTIVELY PERFORMING MEDIA MANAGEMENT OPERATIONS ON A MEMORY DEVICE

(71) Applicant: Micron Technology, Inc., Boise, ID (US)

(72) Inventors: Mikai Chen, Sunnyvale, CA (US); Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/445,293

(22) Filed: Aug. 17, 2021

(65) Prior Publication Data

US 2023/0059589 A1 Feb. 23, 2023

(51) Int. Cl.
*G06F 3/06* (2006.01)
*G06F 12/02* (2006.01)

(52) U.S. Cl.
CPC ............ *G06F 3/0619* (2013.01); *G06F 3/064* (2013.01); *G06F 3/0616* (2013.01); *G06F 3/0659* (2013.01); *G06F 3/0679* (2013.01); *G06F 12/0246* (2013.01); *G06F 2212/7211* (2013.01)

(58) Field of Classification Search
None
See application file for complete search history.

(56) References Cited

U.S. PATENT DOCUMENTS

| 8,566,506 B2 * | 10/2013 | Locasio | G06F 12/0246 711/E12.069 |
| 2010/0100663 A1 * | 4/2010 | Kao | G06F 12/0246 711/E12.008 |
| 2019/0272115 A1 * | 9/2019 | Hu | G06F 12/0238 |
| 2020/0081828 A1 * | 3/2020 | Chen | G06F 3/0679 |
| 2020/0110544 A1 * | 4/2020 | Zhu | G06F 3/0647 |

* cited by examiner

*Primary Examiner* — Kevin Verbrugge
(74) *Attorney, Agent, or Firm* — Lowenstein Sandler LLP

(57) ABSTRACT

A respective write cycle count for each of a plurality of data units of a memory device is obtained. Based on the respective write cycle count, whether a data unit of the plurality of data units satisfies a media management criterion is determined. Responsive to determining that the respective write cycle count satisfies the media management criterion, a media management operation every first constant cycle count on the data unit is performed. Responsive to determining that the respective write cycle count does not satisfy the media management criterion, a media management operation every second constant cycle count on the data unit is performed. The second constant cycle count is less than the first constant count.

20 Claims, 5 Drawing Sheets

US 11,709,602 B2

ADAPTIVELY PERFORMING MEDIA MANAGEMENT OPERATIONS ON A MEMORY DEVICE

TECHNICAL FIELD

Embodiments of the disclosure relate generally to memory sub-systems, and more specifically, relate to adaptively performing media management operations on a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
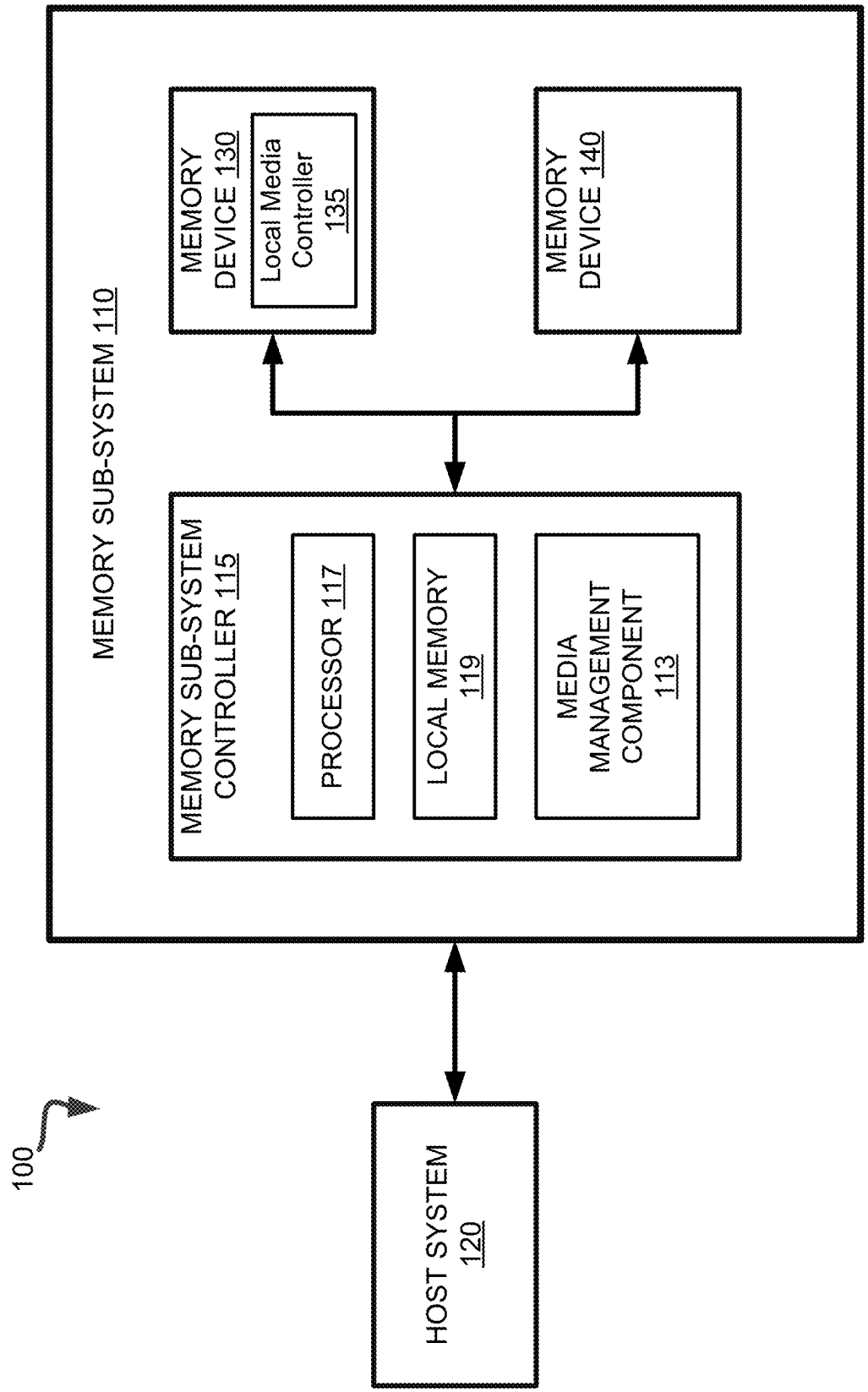
FIG. 1 illustrates an example computing system that includes a memory sub-system in accordance with some embodiments of the present disclosure.

Aspects of the present disclosure are directed to adaptively performing media management operations on a memory device. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Memory devices at a memory sub-system can have particular properties that provide challenges in the operation of the memory sub-system. Some memory devices, such as non-volatile memory devices, can have limited endurance. For example, some memory devices can be written, read, or erased a finite number of times before the memory devices begin to physically degrade or wear and eventually fail.

A memory sub-system controller can perform media management operations to mitigate the amount of physical wear on the memory devices and lengthen the overall lifetime of the memory sub-system. For example, the memory sub-system controller can perform a media management operation (e.g., a wear leveling operation) to distribute the physical wear across data units of a memory device. A data unit refers to a particular amount of memory, such as a page or a block, of a memory device. To perform a media management operation, the memory sub-system controller can identify a data unit at a memory device that is subject to a significant amount of physical wear and can move data stored at the data unit to another data unit subject to a smaller amount of physical wear. In some instances, a data unit can be subject to a significant amount of physical wear if a large number of memory access operations, such as write operations (i.e., program operations) or read operations, are performed at the data unit. As such, in conventional systems, the memory sub-system controller can identify data units that are subject to large amounts of physical wear based, for example, on write counts for each data unit. A write count refers to a number of times that the memory sub-system controller performs a write operation at a particular data unit over the lifetime of the particular data unit.

To perform media management operation on the data unit, the memory sub-system controller sets a predetermined constant cycle count (e.g., 10 k-50 k) by which a media management operation is to be performed. Every predetermined constant cycle count, the memory sub-system controller performs a media management operation (e.g., wear leveling operation). In some instances, after a high number of cycle counts, data units are likely to fail (e.g., need to be retired) prior to a subsequent media management operation. Conversely, data units with low number of cycle counts are still capable of memory access operations at the predetermined constant cycle count after the previous media management operation. Accordingly, the data units with high number of cycle counts will be prematurely retired compared to the data units with low number of cycle counts. In a conventional memory sub-system, if enough data units (e.g., 20% of the data units of the memory device) fail before the subsequent media management operation, the memory sub-system controller would retire the memory device as a whole even though the remaining data units (e.g., 80% of the data units of the memory device) have not failed (e.g., do not need to be retired).

Aspects of the present disclosure address the above and other deficiencies by enabling a memory sub-system controller to, towards the end of life of a data unit, adaptively change a predetermined constant cycle count by which a media management operation is to be performed on the data unit. To adaptively change the predetermined constant cycle count, a media management threshold is determined (e.g., based on a range in which the current cycle count falls within) to help distinguish between an early life of the data unit (e.g., early media management stage) and a late life of the data unit (e.g., late media management stage). During the early media management stage of the data unit, the memory sub-system controller sets the predetermined constant cycle count to a first constant cycle count. As a result, media management operation is performed on the data unit every first constant cycle count until the media management threshold is satisfied indicating that the data unit has entered late media management stage of the data unit. During the late media management stage of the data unit, the memory sub-system controller sets the predetermined constant cycle count to a second constant cycle count until the end of life of the data unit has been reached. Depending on the embodiment, the second constant cycle count is adjusted to enable more media management operations prior to the end of life of the data unit. As a result, media management operations are performed on the data unit every second constant cycle count until the end of life. Depending on the embodiment, various trigger conditions can be set to indicate when to adaptively adjust the predetermined constant cycle count by which media management operations are to be performed.

Advantages of the present disclosure include, but are not limited to, an increase in the overall lifetime of a memory sub-system and the prevention of premature failure of the memory sub-system by adaptively adjusting the predetermined cycle count by which media management operation are to be performed on the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media management component 113 that can adaptively perform media management operations on a memory device 130, 140. In some embodiments, the memory sub-system controller 115 includes at least a portion of the media management component 113. In some embodiments, the media management component 113 is part of the host system 110, an application, or an operating system. In other embodiments, local media controller 135 includes at least a portion of media management component 113 and is configured to perform the functionality described herein.

The media management component 113 can facilitate adaptively performing media management operations on a data unit (e.g., a block, a page, etc.). A media management operation can include a wear leveling operation, write scrub operation, and so forth. It should be noted that, although some embodiments of the present disclosure are described with respect to a wear leveling operation, aspects of this disclosure can be applied to performing any media management operation (e.g., write scrub operation). Media management component 113 can perform media management operations on the data unit every predetermined constant cycle count. The predetermined constant cycle count can be determined by the media management component 113 based on a trigger condition. The trigger condition represents a cycle count in which media management operations are performed on the data unit a first predetermined constant cycle count during the early media management stage and a second predetermined constant cycle count during the late media management stage. The trigger condition is satisfied, if the current cycle count is greater than or equal to the trigger condition. In one embodiment, media management component 113 determines a media management threshold which distinguishes between the early media management stage and the late media management stage by obtaining the life expectancy of the data unit and setting the trigger condition to a percentage of the life expectancy (e.g., 90%). Prior to the trigger condition, the data unit is considered to be in the early media management stage. After the trigger condition, the data unit is considered to be in the late media management stage. In the early media management stage of the data unit, the media management component 113 performs media management operations every first constant cycle count (e.g., T). In the late media management stage of the data unit, media management component 113 performs media management operations more often at a fraction of the first constant cycle count of the early media management stage (e.g., T/3 also referred to as "t"). Further details with regards to the operations of the media management component 113 are described below.

Figure 2:
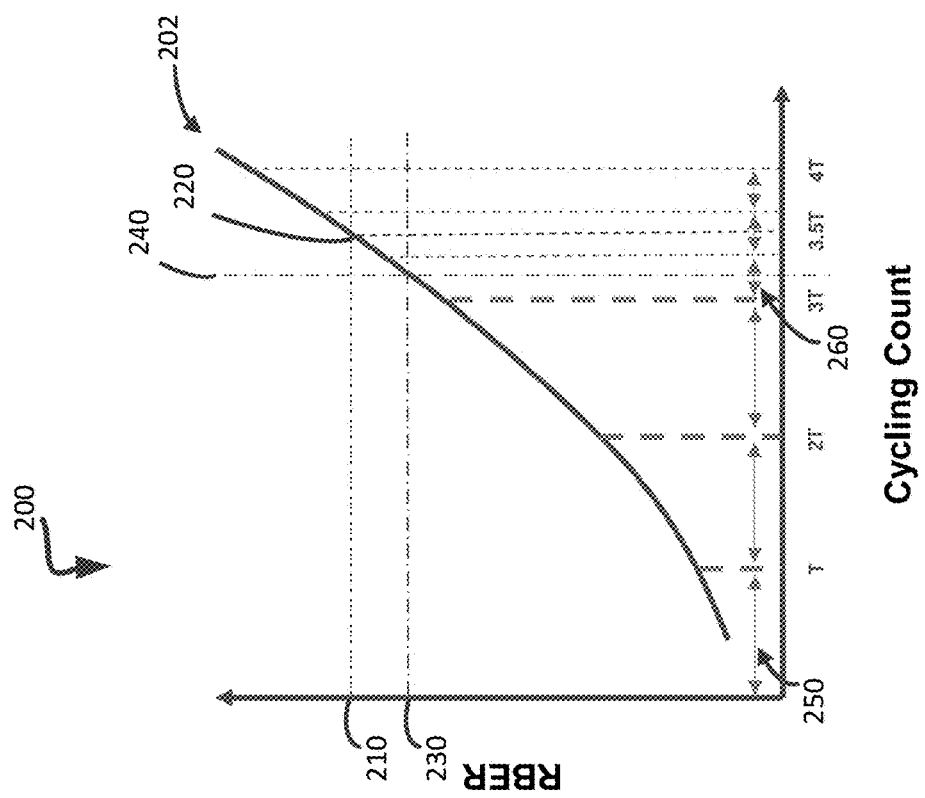
FIG. 2 is a graph of adaptive media management operations performed on a memory device in accordance with some embodiments of the present disclosure.

FIG. 2 is a graph of adaptive media management operations performed on a memory device. Graph 200 provides a graph of a data unit 202 which indicates the amount of physical wear on the data unit at each cycling count. The amount of physical wear caused to data unit 202 can correspond to reliability metric, such as a measured error rate (e.g., raw bit error rate (RBER)). as indicated on the y-axis of graph 200. The cycling count of the data unit 202 corresponds to the number of memory access operations (e.g., write operations, read operations, or etc.) performed on the data unit 202 indicated on the x-axis of graph 200. The RBER of the data unit increases with the number of memory access operations. Over time with a significant number of memory access operations, the data unit can become corrupted and the data stored at the data unit becomes unreliable and therefore unusable (e.g., marked as defective and retired). Accordingly, data unit 202 has a target RBER 210 which indicates a point in which the data unit 202 becomes unreliable. This target RBER 210 is associated with a certain number of memory access operations represented as cycling counts 220 indicating that data unit 202 has reached the end of life.

During the life time of the data unit 202, media management operations are performed every constant cycling count 250, resulting in media management operations being performed at cycling count T, 2T, and 3T. After cycling count 3T, media management operations would typically be performed at a constant cycling count 250 from 3T which would be 4T, however, based the data unit 202 reaching the cycling count 220 associated with the target RBER 210 between cycling count 3T and 4T (e.g., 3.5T), the data unit 202 would be considered defective and would be retired prior to a subsequent media management operation being performed. As a result, a media management threshold 230 is associated with cycling count 240, which indicates a point at which the constant cycling count 250 is to be changed due to the data unit 202 being near end of life. The media management threshold 230 can be a percentage of the target RBER 210 (e.g., 90% of the target RBER). In some embodiments, multiple media management thresholds 230 can be implemented to adaptively control media management operations during the life time of a data unit. The media management threshold 230 associated with cycling count 240 is before the end of life 220 of the data unit 202. Cycling count 240 indicates whether to perform media management operations every constant cycling count 250 (e.g., T) or every constant cycling count 260 (e.g., t). Constant cycling count 260 is a fraction of the constant cycling count 250 (e.g., T/3). Constant cycling count 260 can be configurable based on a tradeoff between memory device utilization (e.g., data unit life time) and performance of the data unit. To configure the constant cycling count 260, for example, includes determining a fractional coefficient to apply to the constant cycling count 250, in which the fractional coefficient is based on a preference between utilization and performance. For example, to prioritize utilization over performance a smaller fractional coefficient can be applied to the constant cycling count 250 resulting in more media management operations being performed prior to end of life of the memory device. In another example, the prioritize performance a larger fractional coefficient can be applied to the constant cycling count 250 resulting in less media management operations being performed prior to end of life of the memory device. Accordingly, once the current cycling count exceeds the cycling count 240 corresponding to media management threshold 230, media management operations are performed every constant cycling count 260 from the previous media management operation 3T (e.g., 3.33T, 3.67T, and 4T).

Figure 3:
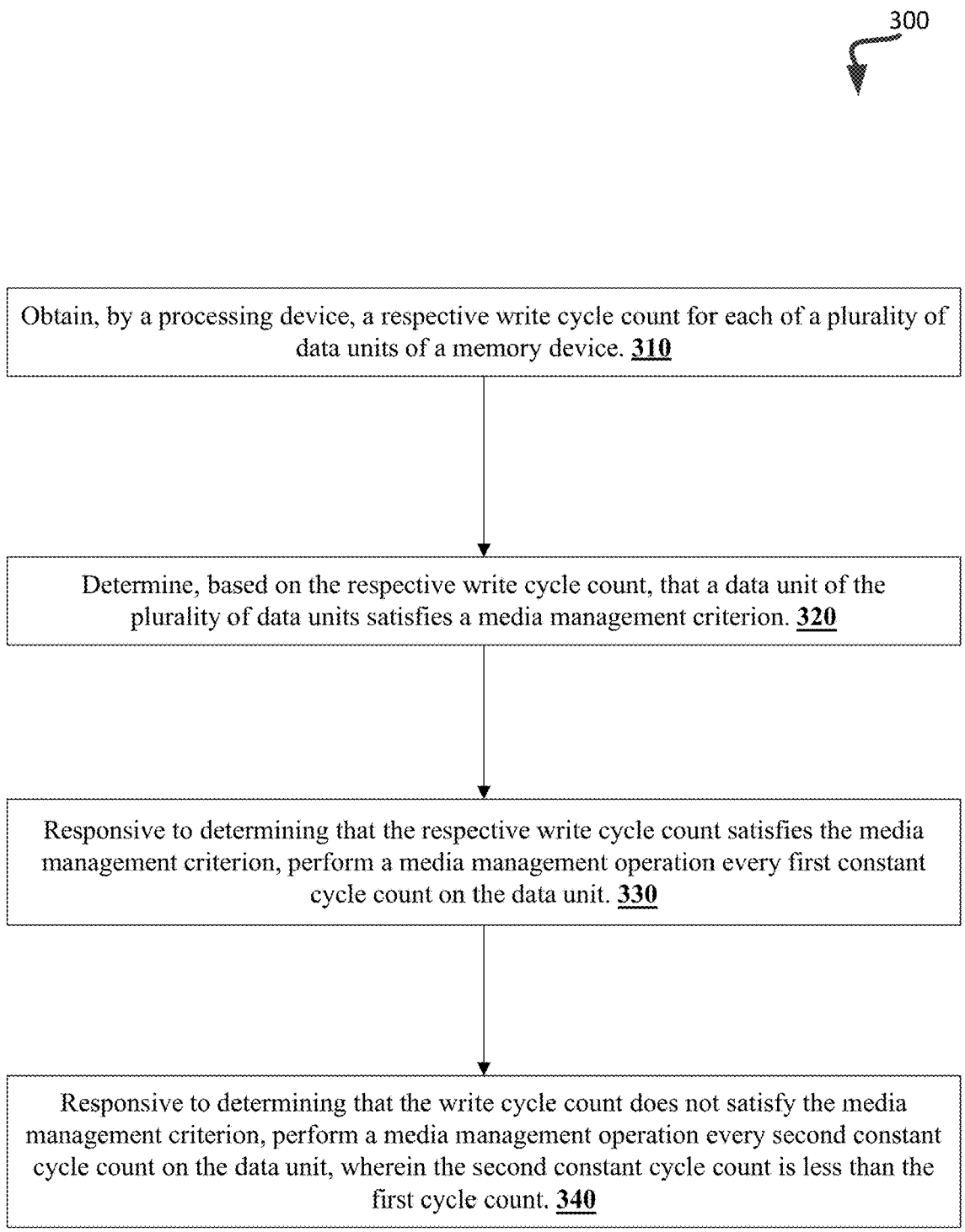
FIG. 3 is a flow diagram of an example method of adaptively performing media management operations on a memory device in accordance with some embodiments of the present disclosure.

FIG. 3 is a flow diagram of an example method 300 of adaptively performing media management operations, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic obtains, by a processing device, a respective write cycle count for each of a plurality of data units of a memory device. As described previously, the write cycle count of the data unit corresponds to the number of memory access operations (e.g., write operations) performed on the data unit. To obtain a respective write cycle count for each of the plurality of data units of the memory device, media management component 113 maintains a write cycle count for each data unit and incrementally updates the write cycle count for each data unit each time a write operation is performed on the respective data unit.

At operation 320, the processing logic determines, based on the respective write cycle count, that a data of the plurality of data units satisfies a media management criterion. In one embodiment, the media management criterion is satisfied if the write cycle count of the data unit of the plurality of data units is less than or equal to a late wear leveling threshold, and the media management criterion is not satisfied if the write cycle count of the plurality of data units exceeds the late wear leveling threshold. As described previously, the late wear leveling threshold (i.e., the media management threshold associated with cycling count which indicates a point in which the constant cycling count is to be replaced based on the data unit being near end of life) can be based on a percentage of the life expectancy of the memory device (e.g., cycling count 220 associated with the target RBER 210).

At operation 330, responsive to determining that the respective write cycle count satisfies the media management criterion, the processing logic performs a media management operation every first constant cycle count. As described previously, media management can be performed every first constant cycle count (e.g., T), resulting media management being performed T, 2T, 3T, etc. Depending on the embodiment, the media management operation is a wear leveling operation. In some embodiments, write operations performed on the data unit of the plurality of data units are delayed based on the respective write cycle count of the data unit reaching a subsequent constant cycle count before the other data units of the plurality of data units reach the subsequent constant cycle count. For example, if a first data unit reaches cycle count 2T prior to the remaining data units, media management operations, such as, for example, wear leveling, performed on the memory device will include the first data unit after the predetermined cycle count and the remaining data units prior to the predetermined cycle count. Accordingly, write operations performed on the first data unit is delayed until the remaining data units have also reached cycle count 2T, thereby allowing media management operations to be performed on all of the data units once the data units have reached cycle count 2T.

At operation 340, responsive to determining that the write cycle count does not satisfies the media management criterion, the processing logic performs a media management operation every second constant cycle count. Depending on the embodiment, the second constant cycle count is less than the first cycle count. As described previously, media management can be performed every second constant cycle count which is a fraction of the first constant cycling count (e.g., T/3). Thus, the media management operations can be performed more frequently on those data units which are closer to end of life. Depending on the embodiment, the media management operation is a wear leveling operation. In some embodiments, write operations performed on the data unit of the plurality of data units are delayed on the respective write cycle count of the data unit reaching a subsequent constant cycle count before the other data units of the plurality of data units reach the subsequent constant cycle count.

Figure 4:
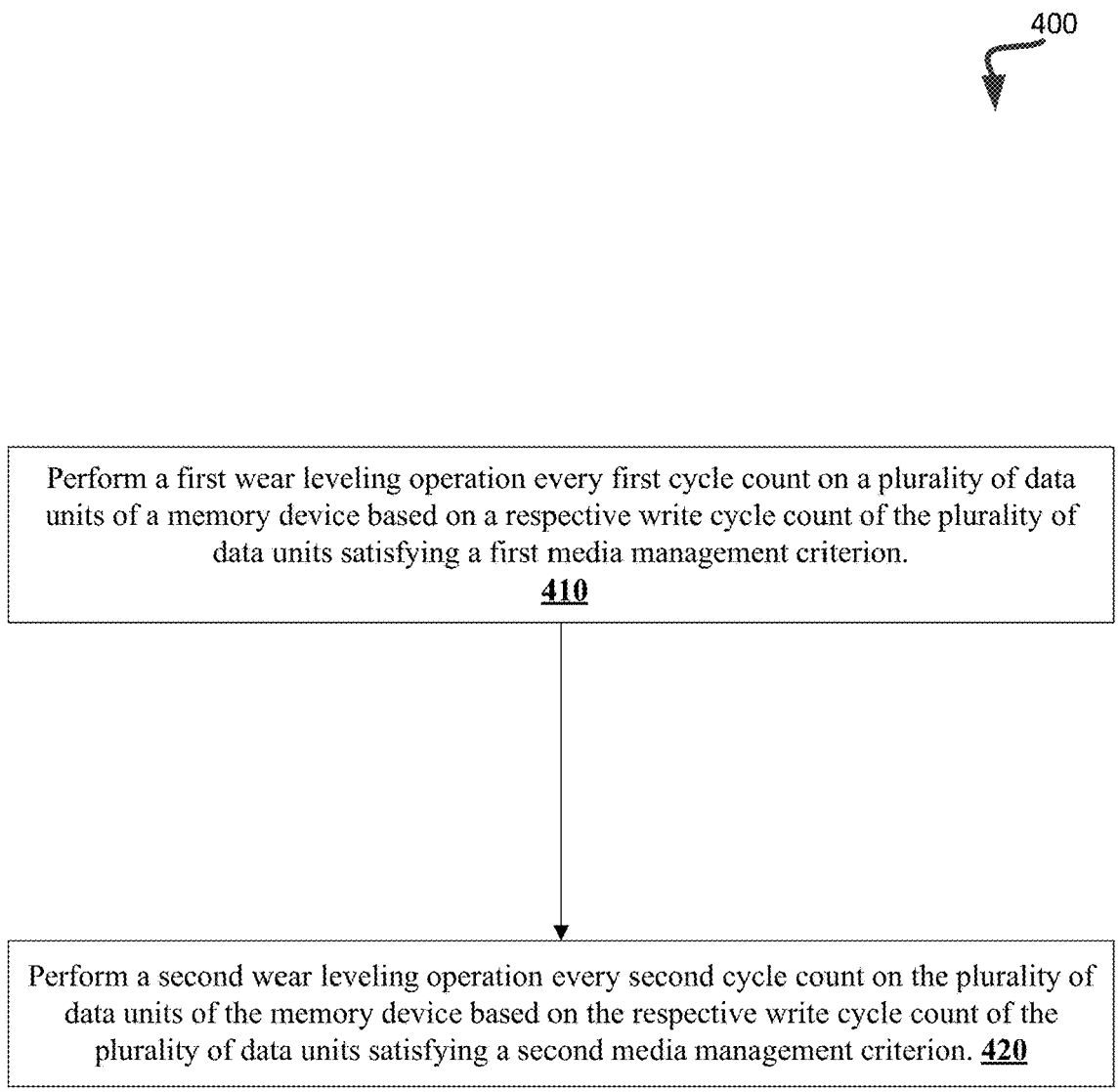
FIG. 4 is a flow diagram of an example method of adaptively performing media management operations on a memory device in accordance with some embodiments of the present disclosure.

FIG. 4 is a flow diagram of an example method 400 of adaptively performing media management operations, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic performs a first wear leveling operation every first cycle count on a plurality of data units of a memory device based on a respective write cycle count of the plurality of data units satisfying a first media management criterion. The respective write cycle count of the plurality of data units refers to a write cycle count corresponding to each of the data units which may be maintained by the media management component 113. As described previously, the cycling count of the data unit corresponds to the number of memory access operations (e.g., write operations) performed on the data unit. In one embodiment, the first media management criterion is satisfied if each write cycle count of the plurality of data units is less than or equal to a predetermined percentage of a life expectancy of the memory device.

At operation 420, the processing logic performs a second wear leveling operation every second cycle count on the plurality of data units of the memory device based on the respective write cycle count of the plurality of data units satisfying a second media management criterion. As described previously, the cycling count of the data unit corresponds to the number of memory access operations (e.g., write operations) performed on the data unit. The second constant cycle count can be a fraction of the first constant cycling count (e.g., T/3). The second media management criterion is satisfied if each write cycle count of the plurality of data units are greater than a predetermined percentage of a life expectancy of the memory device.

Figure 5:
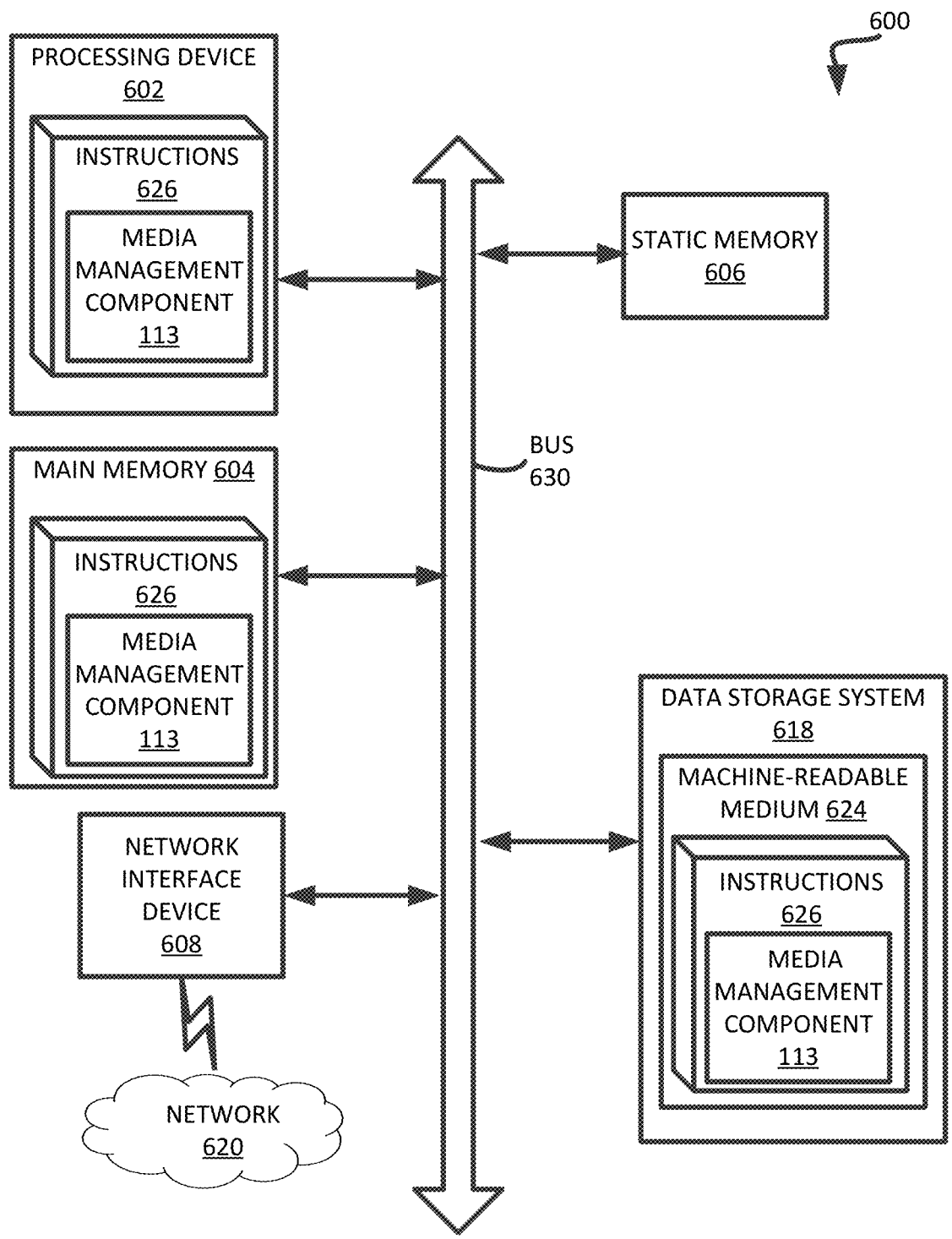
FIG. 5 is a block diagram of an example computer system in which embodiments of the present disclosure may operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media management component (e.g., the media management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device coupled to the memory device, the processing device to perform operations comprising:
obtaining a respective write cycle count for each of a plurality of data units of the memory device;
determining, based on the respective write cycle count, that a data unit of the plurality of data units satisfies a media management criterion;
responsive to determining that the respective write cycle count satisfies the media management criterion, setting a media management operation to be performed every first constant cycle count on the data unit;
responsive to determining that the write cycle count does not satisfy the media management criterion, updating the media management operation to be performed every second constant cycle count from every first constant cycle count on the data unit, wherein the second constant cycle count is less than the first constant cycle count;
responsive to determining that remaining data units of the plurality of data units have not reached a subsequent constant cycle count, delaying write operations to the data unit until the remaining data units reach the subsequent constant cycle count, wherein the subsequent constant cycle count is a subsequent first constant cycle count or a subsequent second constant cycle count; and
responsive to the plurality of data units reaching the subsequent constant cycle count, performing the media management operation on the plurality of data units.

2. The system of claim 1, wherein the respective write cycle count is associated with a number of write operations performed on the data unit.

3. The system of claim 1, wherein the media management criterion is satisfied if the write cycle count of the data unit is less than or equal to a late wear leveling threshold, and wherein the media management criterion is not satisfied if the write cycle count of the data unit exceeds the late wear leveling threshold.

4. The system of claim 3, wherein the late wear leveling threshold is based on a percentage of a life expectancy of the memory device.

5. The system of claim 1, wherein the second constant cycle count is a fraction of the first constant cycle count.

6. The system of claim 1, wherein the media management operation comprises a wear leveling operation.

7. The system of claim 1, wherein the memory device comprises a cross point array of non-volatile memory.

8. A method comprising:
obtaining, by a processing device, a respective write cycle count for each of a plurality of data units of a memory device;
determining, based on the respective write cycle count, that a data unit of the plurality of data units satisfies a media management criterion;
responsive to determining that the respective write cycle count satisfies the media management criterion, setting a media management operation to be performed every first constant cycle count on the data unit;
responsive to determining that the write cycle count does not satisfy the media management criterion, updating the media management operation to be performed every second constant cycle count from every first constant cycle count on the data unit, wherein the second constant cycle count is less than the first constant cycle count;
responsive to determining that remaining data units of the plurality of data units have not reached a subsequent constant cycle count, delaying write operations to the data unit until the remaining data units reach the subsequent constant cycle count, wherein the subsequent constant cycle count is a subsequent first constant cycle count or a subsequent second constant cycle count; and
responsive to the plurality of data units reaching the subsequent constant cycle count, performing the media management operation on the plurality of data units.

9. The method of claim 8, wherein the respective write cycle count is associated with a number of write operations performed on the data unit.

10. The method of claim 8, wherein the media management criterion is satisfied if the write cycle count of the data unit is less than or equal to a late wear leveling threshold, and wherein the media management criterion is not satisfied if the write cycle count of the data unit exceeds the late wear leveling threshold.

11. The method of claim 10, wherein the late wear leveling threshold is based on a percentage of a life expectancy of the memory device.

12. The method of claim 8, wherein the second constant cycle count is a fraction of the first constant cycle count.

13. The method of claim 8, wherein the media management operation comprises a wear leveling operation.

14. The method of claim 8, wherein the memory device comprises a cross point array of non-volatile memory.

15. A non-transitory computer-readable storage medium comprising instructions that, when executed by a processing device, cause the processing device to perform operations comprising:
obtaining, by the processing device, a respective write cycle count for each of a plurality of data units of a memory device;
determining, based on the respective write cycle count, that a data unit of the plurality of data units satisfies a media management criterion;
responsive to determining that the respective write cycle count satisfies the media management criterion, setting a media management operation to be performed every first constant cycle count on the data unit;
responsive to determining that the write cycle count does not satisfy the media management criterion, updating the media management operation to be performed every second constant cycle count from every first constant cycle count on the data unit, wherein the second constant cycle count is less than the first constant cycle count;
responsive to determining that remaining data units of the plurality of data units have not reached a subsequent constant cycle count, delaying write operations to the data unit until the remaining data units reach the subsequent constant cycle count, wherein the subsequent constant cycle count is a subsequent first constant cycle count or a subsequent second constant cycle count; and
responsive to the plurality of data units reaching the subsequent constant cycle count, performing the media management operation on the plurality of data units.

16. The non-transitory computer-readable storage medium of claim 15, wherein the respective write cycle count is associated with a number of write operations performed on the data unit.

17. The non-transitory computer-readable storage medium of claim 15, wherein the media management criterion is satisfied if the write cycle count of the data unit is less than or equal to a late wear leveling threshold, and wherein the media management criterion is not satisfied if the write cycle count of the data unit exceeds the late wear leveling threshold.

18. The non-transitory computer-readable storage medium of claim 15, wherein the late wear leveling threshold is based on a percentage of a life expectancy of the memory device.

19. The non-transitory computer-readable storage medium of claim 15, wherein the media management operation comprises a wear leveling operation.

20. The non-transitory computer-readable storage medium of claim 15, wherein the second constant cycle count is a fraction of the first constant cycle count.

* * * * *